United States Patent
Östrup et al.

(10) Patent No.: US 6,731,944 B1
(45) Date of Patent: May 4, 2004

(54) APPARATUS AND METHOD FOR AUTOMATICALLY CONTROLLING THE FORWARDING OF LOW PRIORITY PAGE REQUESTS

(75) Inventors: Peter Östrup, Dublin (IE); Sinead McAllister, Dublin (IE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/573,992

(22) Filed: May 17, 2000

(51) Int. Cl.[7] .......................... H04M 3/42; H04M 3/00; H04M 1/00; H04Q 7/20
(52) U.S. Cl. .................... 455/458; 455/414.1; 455/418; 455/453; 455/512; 340/7.3
(58) Field of Search ................... 455/412, 414, 455/418, 422, 423, 426, 428, 445, 450, 453, 458, 464, 500, 512, 514, 567, 412.1, 414.1, 422.1, 426.1, 509, 515; 340/7.3

(56) References Cited

U.S. PATENT DOCUMENTS 5,533,094 A * 7/1996 Sanmugam ................. 379/57
6,061,559 A * 5/2000 Eriksson et al. ............ 455/414
6,208,865 B1 * 3/2001 Veerasamy .................. 455/450

FOREIGN PATENT DOCUMENTS

| EP | 0 544 462 A2 | 11/1992 | |
| EP | 0 732 863 A2 | 9/1996 | |
| WO | WO 98/48587 * | 10/1998 | H04Q/7/38 |
| WO | WO 99/55113 | 10/1999 | |
| WO | WO 99/55133 * | 10/1999 | H04Q/7/38 |
| WO | WO 00/78061 A1 | 12/2000 | |

* cited by examiner

*Primary Examiner*—William Trost
*Assistant Examiner*—Meless Zewdu

(57) ABSTRACT

An apparatus and method are provided that can effectively improve a paging scheme of a traditional cellular system. Basically, the apparatus includes a controller (cell load monitor) which operates to determine when a paging distribution handler should forward a low priority page request to a mobile station in order to decrease a processing (blind) load on a processor and to decrease a load on the air interface resources. The controller utilizes a current paging load (first embodiment) and/or a current traffic load (second embodiment) as a factor to help determine when the low priority page request should be forwarded to the mobile station.

18 Claims, 3 Drawing Sheets

APPARATUS AND METHOD FOR AUTOMATICALLY CONTROLLING THE FORWARDING OF LOW PRIORITY PAGE REQUESTS

BACKGROUND OF THE INVENTION

1. Technical Field of the Invention

The present invention generally relates to the cellular telecommunications field and, in particular, to an apparatus and method that automatically controls when a low priority page request can be effectively forwarded to a mobile station.

2. Description of Related Art

In the cellular telecommunications field, one of the most significant design challenges involves the development of new ways to improve how and when a cellular system should page a mobile station. The traditional cellular system supports several common applications that use a paging function to page and locate the mobile station which include, for example, voice call applications, data call applications, Short Message Service (SMS) applications and mobile positioning applications. Each of these common applications must use the paging function to locate the mobile station before being able to complete the particular task (e.g., terminating voice/data calls, forwarding SMS messages, determining the mobile station's location) of that application.

One type of paging function is known as a mobile station probe function which operates to automatically and repeatedly send a low priority page request in an attempt to locate the mobile station. More specifically, the mobile station probe function can repeat (e.g., every ten minutes) the initiation of a low priority page request in an attempt to locate a mobile station that has been switched-off or has been located in a geographic area that does not have radio coverage (for example). Of course, the mobile station must respond to the low priority page request before the application can complete their particular task.

The mobile station probe function is often associated with low priority applications such as, for example, the mobile positioning application and the SMS application. Generally, the low priority applications do not require that the mobile station be immediately located in order to complete their particular task. In contrast, the high priority applications such as, for example, the voice call application and the data call application typically require that the mobile station be immediately located in order to complete their particular task. Thus, the high priority applications seldom use the mobile station probe function.

The problem with traditional paging schemes is that they automatically and repeatedly send low priority page requests to a mobile station regardless of the current paging load and/or the current traffic load within the cellular system which can create an unnecessary load on a processor and air interface resources (e.g., paging channels (PCH) and single cell signaling control channel (SCCH). Therefore, there is a need for an apparatus and method capable of determining when low priority page requests can be effectively forwarded to a mobile station in order to decrease a load on a processor and air interface resources.

BRIEF DESCRIPTION OF THE INVENTION

The present invention is an apparatus and method that can effectively improve the paging scheme of a traditional cellular system. Basically, the apparatus includes a controller (cell load monitor) which operates to determine when a paging distribution handler should forward a low priority page request to a mobile station in order to decrease a processing (blind) load on a processor. The controller utilizes a current paging load (first embodiment) and/or a current traffic load (second embodiment) as a factor to help determine when the low priority page request should be forwarded to the mobile station.

BRIEF DESCRIPTION OF THE PREFERRED EXEMPLARY EMBODIMENTS OF THE PRESENT INVENTION

A more complete understanding of the method and apparatus of the present invention may be had by reference to the following detailed description when taken in conjunction with the accompanying drawings wherein.

DETAILED DESCRIPTION OF THE DRAWINGS

Referring to FIGS. 1–4, there are disclosed different embodiments of an exemplary apparatus 100, 300 and 400 and a preferred method 200 of the present invention.

Although the different embodiments of the present invention are described with reference to the SMS application and the mobile station probe function, it should be understood that the present invention can also be used with other applications (e.g., mobile positioning application) that utilize prioritized page requests. Accordingly, the apparatus 100, 300 and 400 and the preferred method 200 of the present invention should not be construed in a limited manner.

Figure 1:
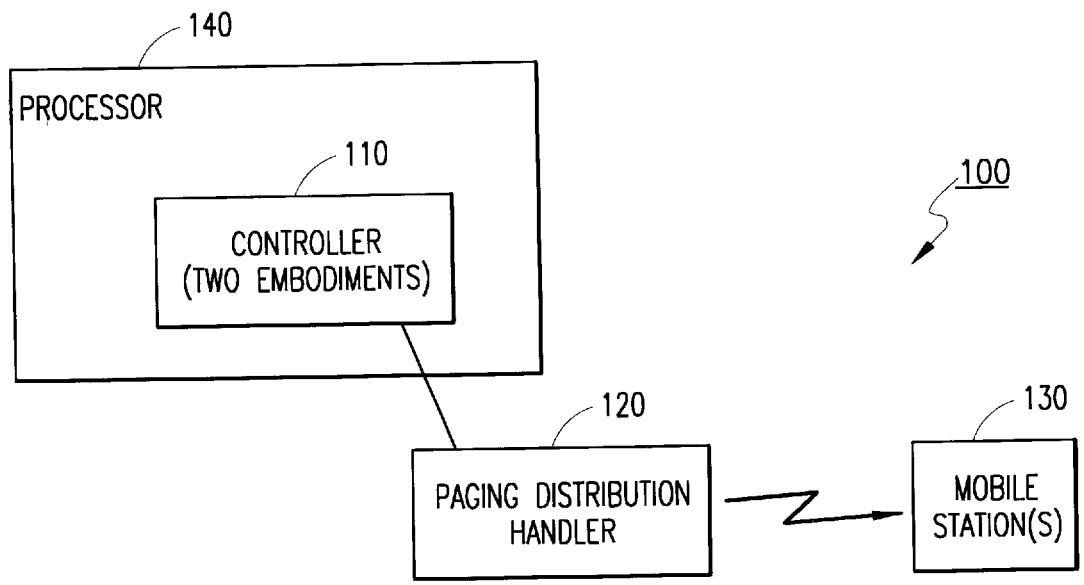
FIG. 1 is a block diagram illustrating the basic components of an apparatus of the present invention.
Figure 2:
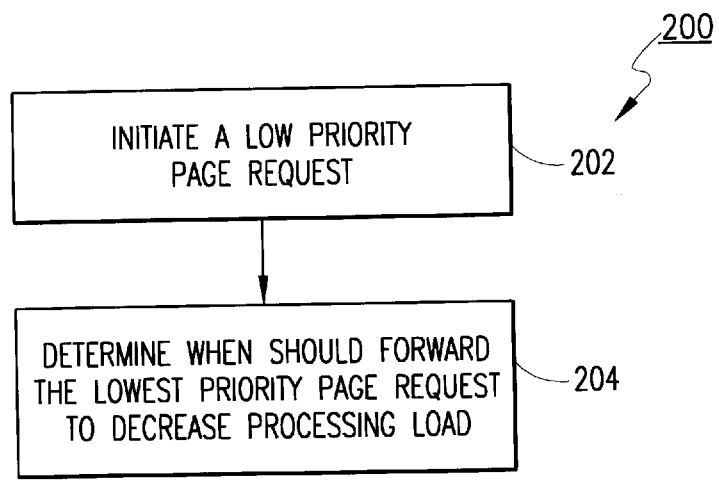
FIG. 2 is a flowchart illustrating the basic steps of a preferred method of the present invention.

Referring to FIGS. 1 and 2, there are illustrated the basic components associated with the apparatus 100 and the basic steps associated with the preferred method 200. Basically, the apparatus 100 includes a controller 110 that operates to determine (step 204) when a paging distribution handler 120 should forward a previously initiated (step 202) low priority page request to a mobile station 130 in order to decrease a processing (blind) load on a processor 140 and to decrease a load on the air interface resources. A "high" processing load on the processor 140 can be attributable to the processing of incomplete call set-ups between the paging distribution handler 120 and the mobile station 130. The controller 110 utilizes the current paging load (first embodiment shown in FIG. 3) and/or the current traffic load (second embodiment shown in FIG. 4) as a factor to determine when the low priority page requests should (if at all) be forwarded to the mobile station 130. The controller 110 need not be an integral component of the processor 140.

With respect to the SMS application, the controller 110 improves the traditional SMS application which requires two pages to deliver the SMS message, where one high priority page is to make sure that a called party (e.g., the mobile station) is present in a radio service area of a cellular system and the other low priority page is used to deliver the SMS message. The present invention improves the traditional SMS application, because the Short Message Service Center (SMS-C) need not make a first high priority page attempt and then a second (and repeated) lower priority page attempts to find the called party. For example, an SMS request may be received by an MSC from an SMS-C. The SMS request can be forwarded by the MSC directly to the Paging Distribution Handler with a high priority attached to it. In the event the mobile station does not respond to the SMS high priority page, then probing efforts are commenced. That is, when the mobile station is probed again for the same SMS, the probe is sent via the Paging Distribution Handler with a low priority until a response from the mobile station is received. This example of an exemplary method in accordance with the present invention will save signaling resources between the SMS-C and the MSC because it eliminates the presently utilized extra signaling protocol between the SMS-C and the MSC. That is, prior to the exemplary method, the signaling protocol required that when an SMS-C sends a "normal" (high priority) page to the MSC and wherein the mobile station that is to receive the page is not found, then an ALERT request (or similar communication) is sent between the MSC and the SMS-C. The ALERT request is required to start additional probing for the mobile station at a low priority. The low priority probing may continue until the mobile station is found. Once the mobile station is found, the SMS-C is notified by the MSC and the SMS-C requests the MSC sends another "normal" (high priority) page out to the mobile station so that the SMS service can be performed. One can easily see that this signaling is uses more signaling resources between the SMS-C and the MSC than that which is required of the exemplary embodiments described herein.

A exemplary embodiment in accordance with the present invention requires a single (one) request from, for example, a SMS-C to the MSC. Upon receipt of the request, the MSC sends one high priority page to the mobile station. If the mobile station does not respond after the first page, then the MSC send low priority pages until the mobile station responds. No "alert" signaling is required between the SMS-C and the MSC to commence the low priority paging. Once the mobile station is found, via the paging efforts, the appropriate service (SMS, mobile positioning, etc) is performed and executed. There is no requirement for another paging effort (either high or low) to perform the service.

Figure 3:
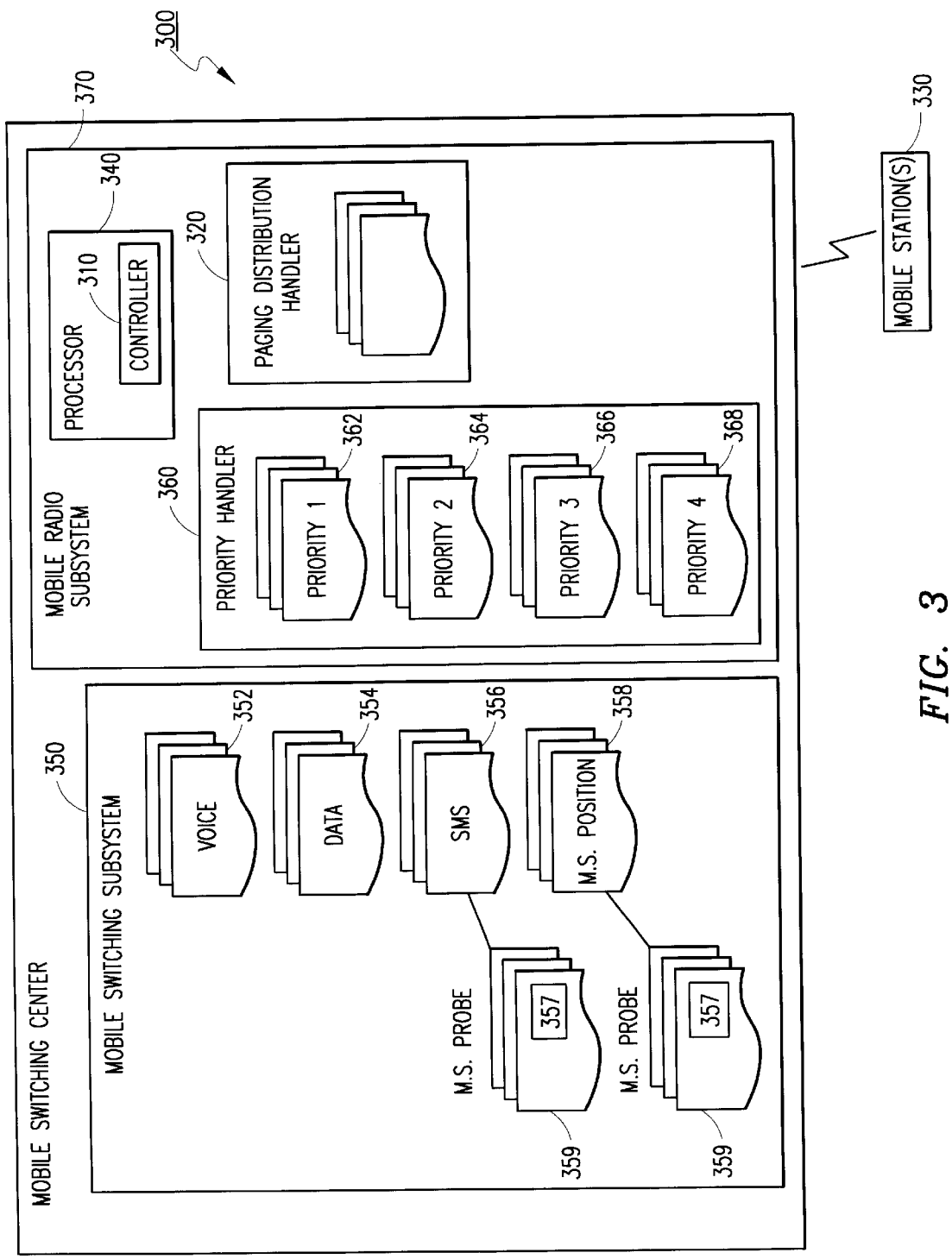
FIG. 3 is a block diagram illustrating in greater detail a first embodiment of the apparatus shown in FIG. 1.

Further explanation of how the controller 110 can improve the traditional SMS application by using all low priority page requests instead of high and then low priority page requests will become apparent after reviewing the description associated with the apparatus 300 shown in FIG. 3.

It should be understood that the method and apparatus of the present invention can be used within any cellular system based on but not limited to the Personal Digital Cellular (PDC) System, the Advanced Mobile Phone System (AMPS), the Digital Advanced Mobile Phone System (D-AMPS) or the Global System for Mobile Communications (GSM) specification (for example).

Referring to FIG. 3, there is illustrated a block diagram of the first embodiment of the apparatus 300. Basically, the controller 310 in the first embodiment utilizes the current paging load (described below) to help determine when a paging distribution handler 320 should forward a low priority page request to a mobile station 330 (e.g., called party) in order to reduce the air interface load and to decrease a processing (blind) load on a processor 340 that is attributable to processing incomplete call set-ups.

The basic architecture of the apparatus 300 (e.g., mobile switching center or any radio signaling node) includes a mobile switching subsystem 350 having different applications such as, for example, voice call applications 352, data call applications 354, SMS message applications 356, and mobile positioning applications 358. Each application 352, 354, 356 and 358 can be classified as either a low priority application (e.g., applications 356 and 358) or a high priority application (e.g., applications 352 and 354). In addition, the different applications can be prioritized such that during conflicts in resource usages (e.g., congestion) there is a predetermined order in which the applications are processed. Moreover, the present invention enables an application (e.g., SMS message application 356) to use different priorities (e.g. low, high) at different repetitions of a page request to reduce processor load, to reduce air interference load, and to reduce signaling within the network.

Each application 352, 354, 356 and 358 utilizes a paging function that operates to locate the mobile station 330 which enables the application to complete the particular task (e.g., terminating voice/data calls, forwarding SMS messages, determining the mobile station's location). Generally, the paging function can initiate a page request (e.g., high or low priority page request) in an attempt to locate the mobile station 330. As mentioned earlier, one type of paging function is the mobile station probe function which operates to automatically and repeatedly initiate a low priority page request in an attempt to locate the mobile station 330. It is described in greater detail below as to how the determination is made on when these low priority page requests are actually forwarded (not initiated) to the mobile station 330.

The mobile station probe function 359 is often associated with low priority applications such as, for example, the SMS application 356 and the mobile positioning application 358 which do not require that the mobile station 330 be immediately located in order to complete their particular task. In contrast, the high priority applications such as, for example, the voice call application 352 and the data call application 354 typically require that the mobile station 330 be immediately located in order to complete their particular task. Thus, the high priority applications generally do not use the mobile station probe function 359 as a paging function.

The mobile switching subsystem 350 connects to a priority handler 360 located within a mobile radio subsystem 370. The priority handler 360 includes a set of priority queues 362, 364, 366 and 368 where page orders (e.g., low or high priority page requests) received from applications 352, 354, 356 and 358 are stored while waiting for idle resources in the paging distribution handler 320. As shown, the priority queues 362, 364, 366, and 368 are respectively connected to applications 352, 354, 356 and 358. Each priority queue 362, 364, 366 and 368 can include any number of queue positions (e.g., thirty-two queue positions) for storing the page orders. The mobile radio subsystem 370 also contains the controller 310 and the processor 340.

In determining when the paging distribution handler 320 can effectively forward a low priority page request to a mobile station 330, the controller 310 may first establish some predefined rules to help prevent chaotic situations. For example, the controller 310 may control the priority queues 362, 364, 366, and 368 which can be classified as either a high priority queue (e.g., queues 362 and 364) or a low priority queue (e.g., queues 366 and 368) in a manner such that when a high priority page request is present within one of the high priority queues then the paging distribution handler 320 is prevented from receiving low priority page requests from the low priority queues. In addition, the paging distribution handler 320 can be limited such that only a predetermined number of the paging distribution resources can be occupied (at any point in time) by low priority page requests. For instance, the paging distribution handler 320 can be controlled to reserve 25% of its paging distribution resources as a maximum usage for processing low priority page requests.

In view of the aforementioned rules, the low priority paging applications 356 and 358 can now send the low priority page requests to the respective low priority queues 366 and 368 at any rate until congestion occurs in one of the low priority queues 366 and 368. Of course, the low priority page requests are initiated when the mobile switching subsystem 350 receives a signal originated by the calling party (not shown). When one of the low priority queues 366 and 368 becomes congested with low priority page requests, a handshaking mode is triggered. The handshaking mode ensures that the mobile stations that have not been paged using the mobile station probe function 359 will be paged before the mobile stations that are waiting for a repeat page attempt. Basically, in handshaking mode, new page requests (from e.g. SMS-C) are put first in a queue 357. The queued page requests are sent to priority handover queues 366 and 368 when they can handle another low priority page. When queue 357 is empty then handshaking mode is terminated.

The handshaking mode utilizes a queue 357 (only two are shown) located within each mobile station probe function 359 and coupled to the respective low priority queue 366 and 368. More specifically, the handshaking mode when triggered can include the following operations: (1) storing all new low priority page requests within the queue 357 of the mobile station probe function 359; (2) sending a page request from the mobile station probe function 359 to the low priority queue 366 or 368; (3) receiving, at the mobile station probe function 359, a response signal indicating how many low priority page requests can now be handled by the low priority queue 366 or 368; and (4) forwarding, to the low priority queue 366 or 368, the indicated number (or as many as possible) of low priority page requests that are stored in the queue 357 of mobile station probe function 359. The paging distribution handler 330 can then forward the received low priority page requests to the mobile station 330. When all of the low priority page requests in the queue 357 have been sent to the low priority queue 366 or 368 then the mobile station probe function 359 can reenter the normal mode and forward the low priority page requests to the low priority queues 366 and 368 until congestion occurs and handshaking mode is required again. It should be understood that this handshaking mode can occur independently from one another in either of the low priority applications 356 or 358.

Therefore, the controller 310 in the first embodiment can use the current paging load (e.g., total number of low and high priority page requests) to help determine when the paging distribution handler 320 can effectively forward a low priority page request to the mobile station(s) 330. In fact, the controller 310 can prevent the mobile distribution handler 320 from originating any new low priority page requests whenever there is a high paging load.

Figure 4:
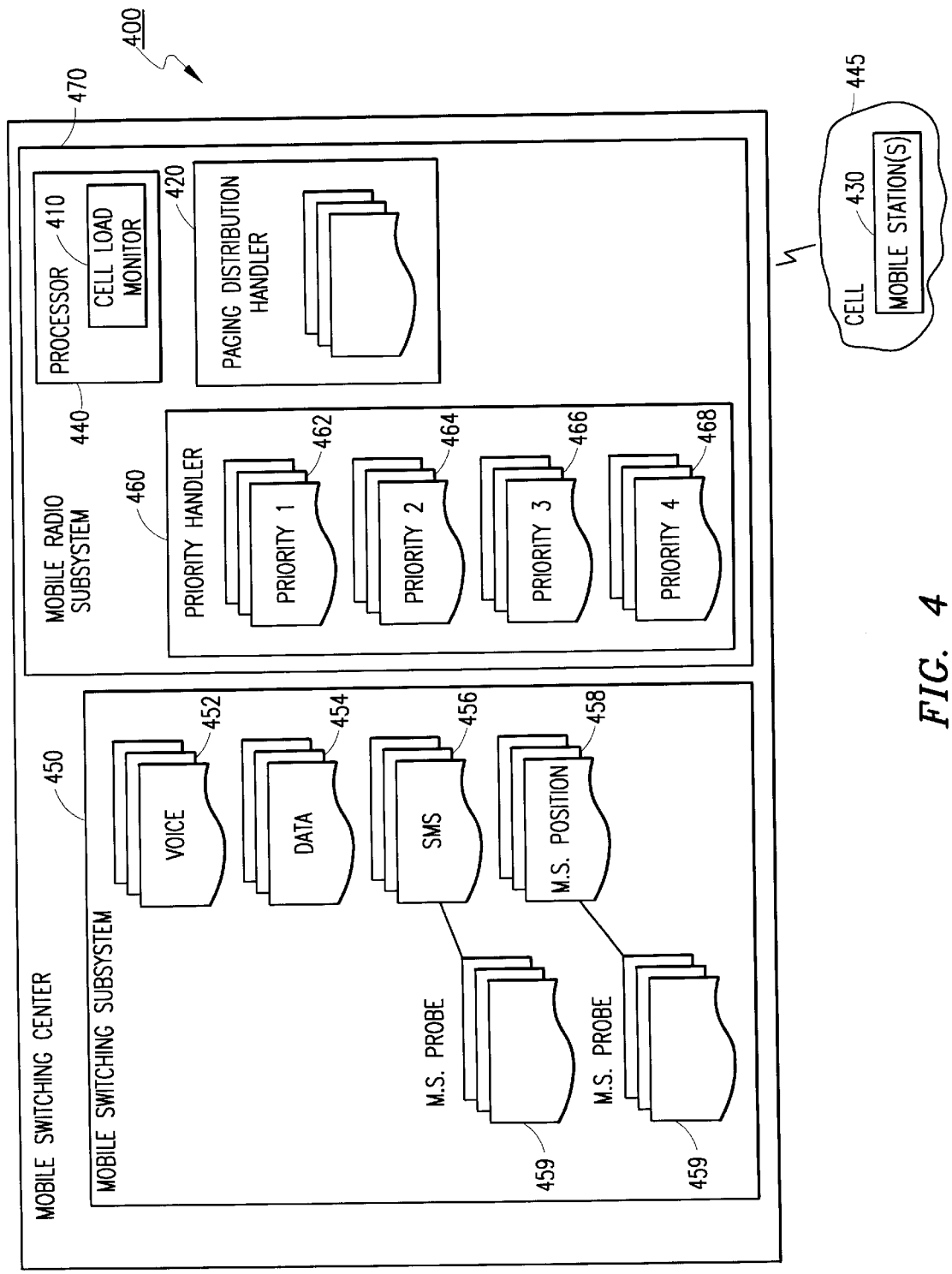
FIG. 4 is a block diagram illustrating in greater detail a second embodiment of the apparatus shown in FIG. 1.

Referring to FIG. 4, there is illustrated a block diagram of the second embodiment of the apparatus 400. Basically, the controller 410 (e.g., cell load monitor) in the second embodiment monitors the current traffic load (described below) to help determine when a paging distribution handler 420 should forward a low priority page request to a mobile station 430 in order to reduce air interface load and to decrease a processing (blind) load on a processor 440 that is attributable to processing incomplete call set-ups.

The basic architecture of the apparatus 400 (e.g., mobile switching center or radio signaling controlling node) includes a mobile switching subsystem 450 having different applications such as, for example, voice call applications 452, data call applications 454, SMS message applications 456, and mobile positioning applications 458. Each application 452, 454, 456 and 458 can be classified as either a low priority application (e.g., applications 456 and 458) or a high priority application (e.g., applications 452 and 454). In addition, the different applications can be prioritized such that during conflicts in resource usages (e.g., congestion) there is a predetermined order in which the applications are processed.

Each application 452, 454, 456 and 458 utilizes a paging function that operates to locate the mobile station 430 which enables the application to complete the particular task (e.g., terminating voice/data calls, forwarding SMS messages, determining the mobile station's location). Generally, the paging function can initiate a page request (e.g., high or low priority page request) in an attempt to locate the mobile station 430. As mentioned earlier, one type of paging function is the mobile station probe function 459 which operates to automatically and repeatedly initiate a low priority page request in an attempt to locate the mobile station 430. It is described in greater detail below as to how the determination is made on when these low priority page requests are actually forwarded (not initiated) to the mobile station 430.

The mobile station probe function 459 is often associated with low priority applications such as, for example, the SMS application 456 and the mobile positioning application 458 which do not require that the mobile station 430 be immediately located in order to complete their particular task. In contrast, the high priority applications such as, for example, the voice call application 452 and the data call application 454 typically require that the mobile station 430 be immediately located in order to complete their particular task. Thus, the high priority applications generally do not use the mobile station probe function 459 as a paging function.

The mobile switching subsystem 450 connects to a priority handler 460 located within a mobile radio subsystem 470. The priority handler 460 includes a set of priority queues 462, 464, 466 and 468 where page orders (e.g., low or high priority page requests) received from applications 452, 454, 456 and 458 are stored while waiting for idle resources in the paging distribution handler 420. As shown, the priority queues 462, 464, 466, and 468 are respectively connected to applications 452, 454, 456 and 458. Each priority queue 462, 464, 466 and 468 can include any number of queue positions (e.g., thirty-two queue positions) for storing the page orders. The mobile radio subsystem 470 also contains the cell load monitor 410 and the processor 440.

In determining when the paging distribution handler 420 can effectively forward a low priority page request to the mobile station 430(s), the cell load monitor 410 first determines the traffic load within a cell 445. Thereafter, the cell load monitor 410 operates to prevent the paging distribution handler 420 from forwarding one or more of the low priority page requests to the cell 445 when the load within the cell exceeds a predetermined threshold. As mentioned above, the low priority requests are initiated when the mobile switching subsystem 450 receives a signal originated by the calling party (not shown). Alternatively, the cell load monitor 410 can also operate to prevent the paging distribution handler 420 from forwarding one or more levels of prioritized page requests (e.g., queue 468) to the cell 445 when the load within the cell exceeds a predetermined threshold.

The cell load monitor 410 may use multiple thresholds (e.g., four thresholds) when determining whether or not the paging distribution handler 420 should be prevented from forwarding low priority page requests or entire levels of prioritized page requests. For example, when the traffic level exceeds one of the pre-defined thresholds, then, perhaps, no low priority page requests or one or more priorities will be sent to that cell until another the traffic level is lower and a threshold (lower than or the same as the first threshold) is passed. In fact, the cell load monitor 410 can prevent the paging distribution handler 420 from forwarding any low priority page request(s) whenever there is a high traffic load.

Moreover, after the page is sent to the cell 445, a check can be made to determine if the cell is available for the concerned paging priority. If the cell 445 is unavailable for the concerned paging priority, then the page is not sent on the Paging Channel (PCH) in that cell. In other words, if the access intensity on the control channel is too high for optimal throughput then the page is not sent over the air. The access intensity can also be checked in Radio Network level mode (BSC, MSC, etc.).

It should be understood that various statistical measurements can be monitored and used by the cell load monitor 410 to activate/deactivate the forwarding of low priority page requests or entire levels of prioritized page requests to the cell 445. For instance, the statistical measurements can include traffic load measurements on an Access Channel (e.g., Control Channel (CCH)) or on the Paging Channel (PCH).

In addition, the priority handling of the present invention can be performed in a base station (not shown) instead of the mobile switching center by connecting the base station to the mobile switching center using a Transmission Control Protocol/Internet Protocol (TCP/IP) Multicast (for example). Thus, the base station could maintain the priority queues and a cell load monitor, or the base station could have the priority queues and be informed of the traffic load measured by a cell load monitor which is located in the mobile switching center.

Moreover, the priority handling of the method 200 and apparatuses 100, 300 and 400 can be implemented in any type of radio signaling controlling node of a cellular network including, for example, a Base Station Controller (BSC), a Radio Network Controller (RNC), a Radio Network Server (RNS), and a Base Station.

It should also be understood that the different aspects of apparatus 300 and apparatus 400 can be combined and intermixed with one another in many different ways to create different embodiments.

From the foregoing, it can be readily appreciated by those skilled in the art that the present invention provides an apparatus and method that effectively decreases the processing load within a processor of a mobile communication network by avoiding the traditional manual paging parameters from being introduced into the repeatable paging schemes. This helps to prevent unnecessary faults from occurring in the cellular system and helps to optimize the performance of the mobile station probe function and other repeatable paging functions.

Although two embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An apparatus comprising:
   a paging handler for handling high priority page requests and low priority page requests;
   a controller for determining when said paging handler should forward a low priority page request to a mobile station in order to decrease a processing load on a processor and to decrease a load on air interface resources;
   a low priority queue and a high priority queue both of which are connected to said paging handler and controlled by said controller such that when a high priority request is present within the high priority queue then said paging handler is prevented from receiving the low priority page request from the low priority queue; and
   a queue within a paging function capable of interacting with the low priority queue using a handshaking mode which is triggered when the low priority queue is congested with low priority page requests.

2. The apparatus of claim 1, wherein said controller further includes a monitor capable of determining a traffic load within a cell serving the mobile station.

3. The apparatus of claim 2, wherein said monitor is further capable of preventing said paging handler from forwarding the low priority page request whenever the traffic load within the cell exceeds a predetermined threshold.

4. The apparatus of claim 2, wherein said monitor further includes a cell traffic load monitor capable of measuring the traffic load on at least one traffic channel.

5. The apparatus of claim 1, wherein said controller further includes means for limiting a number of resources said paging handler can reserve to handle low priority page requests.

6. The apparatus of claim 1, wherein said handshaking mode when triggered includes the following steps:
   storing all new low priority page requests within the queue of the paging function;
   sending a page request from the paging function to the low priority queue;
   receiving, at the paging function, a response signal indicating how many low priority page requests can now be handled by the low priority queue; and
   forwarding, to the low priority queue, the indicated number of low priority page requests currently stored in the queue of the paging function.

7. The apparatus of claim 1, wherein said low priority page request further includes a page request that is repeatable in accordance with a mobile station probe function.

8. The apparatus of claim 7, wherein said mobile station probe function is used by a short message service.

9. The apparatus of claim 8, wherein said short message service only uses low priority page requests.

10. The apparatus of claim 1, wherein said processing load further includes a blind load attributable to incomplete call set-ups.

11. A method for decreasing a processing load within a processor of a mobile communications network, said method comprising the steps of:
    initiating a low priority page request; and
    determining when the low priority page request can be effectively forwarded by a paging handler in order to decrease the processing load on the processor that is attributable to incomplete call set-ups, said step of determining further comprises
       controlling a low priority queue and a high priority queue both of which are connected to the paging handler such that when a high priority page request is present within the high priority queue then the paging handler is prevented from receiving the low priority page request from the low priority queue; and connecting the low priority queue to a queue within a paging function using a handshaking mode which is triggered when the low priority queue is congested with low priority page requests.

12. The method of claim 11, wherein said step of determining further includes the steps of:

determining a traffic load within a cell; and preventing the paging handler from forwarding the low priority page request whenever the traffic load within the cell exceeds a predetermined threshold.

13. The method of claim 12, wherein said step of determining a traffic load within a cell further includes measuring the traffic load on at least one traffic channel.

14. The method of claim 11, wherein said step of determining further includes limiting a number of low priority page requests with respect to a number of high priority page requests that the paging handler can accommodate at one time.

15. The method of claim 11, wherein said step of determining further includes forwarding only low priority page requests for a short message service.

16. The method of claim 11, wherein said handshaking mode when triggered includes the following steps:

storing all new low priority page requests within the queue of the paging function;

sending a page request from the paging function to the low priority queue;

receiving, at the paging function, a response signal indicating how many low priority page requests can now be handled by the low priority queue; and forwarding, to the low priority queue, the indicated number of low priority page requests currently stored in the queue of the paging function.

17. A mobile switching center comprising:

a paging handler; and a controller for determining when said paging handler can effectively forward a low priority page request in order to decrease a blind load within a processor;

a low priority queue and a high priority queue both of which are connected to said paging handler and controlled by said controller such that when a high priority page request is present within the high priority queue then said paging handler is prevented from receiving the low priority page request from the low priority queue; and a queue within a mobile station probe function capable of interacting with the low priority queue using a handshaking mode which is triggered when the low priority queue becomes congested with low priority page requests.

18. The mobile switching center of claim 17, wherein said handshaking mode when triggered includes the following steps:

storing all new low priority page requests within the queue of the mobile station probe function;

sending a page request from the mobile station probe function to the low priority queue;

receiving, at the mobile station probe function, a response signal indicating how many low priority page requests can now be handled by the low priority queue; and forwarding, to the low priority queue, the indicated number of low priority page requests that are stored in the queue of the mobile station probe function.

* * * * *